Nov. 22, 1960   N. L. SOLOMON   2,960,742
PLASTIC GARMENT CLIP
Filed May 29, 1958
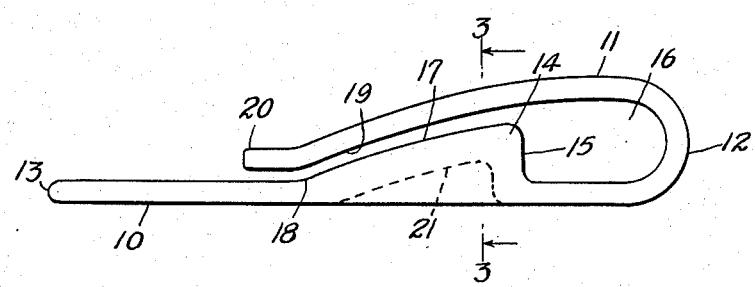
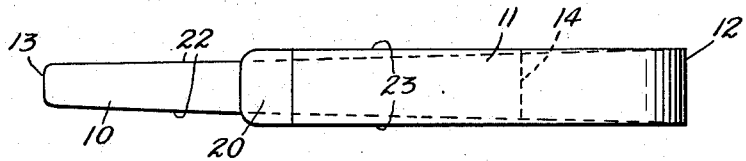
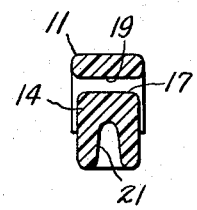
INVENTOR.
NATHAN L. SOLOMON
BY
ATTORNEY

2,960,742
PLASTIC GARMENT CLIP

Nathan L. Solomon, 343 Highview Road,
Englewood, N.J.

Filed May 29, 1958, Ser. No. 738,700

2 Claims. (Cl. 24—255)

This invention relates to a molded plastic clip designed for use in gripping and holding various types and kinds of garments in support or coupling thereof. More particularly, the invention deals with a clip of the character described employing long and short members integrally joined in a spring loop, wherein the long member includes a raised cam and gripper portion arranged in close proximity to the short member in establishing firm gripping action between the members upon a fabric or garment of any type or kind.

Still more particularly, the invention deals in a clip of the character described, wherein the long member is gradually contracted to its free end; whereas, the short member is of the same width throughout its length.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is an enlarged side view of a clip made according to my invention;

Fig. 2 is a plan view of the structure as seen in Fig. 1; and

Fig. 3 is a section on the line 3—3 of Fig. 1.

In illustrating one adaptation of my invention, I have shown in the accompanying drawing a molded plastic clip, which can be molded in any desired color to suit unlimited uses thereof. The clip comprises a long leg or member 10 and a short leg or member 11, these members being joined and spaced by an integral spring loop 12. In this connection, it will be understood that the plastic material employed will be such as to provide relatively strong spring properties and, in Fig. 1 of the drawing, the clip is shown substantially as it would be molded in a die and, actually, in the chilling operation, the member 11 will have a tendency to move into engagement with the member 10, so that there would be substantially little or no clearance between the members or parts thereof.

At this time, it is also pointed out that the showing in the drawing is extremely enlarged and, accordingly, clearances between the parts are proportionately large.

The member 10 is straight and has, intermediate the contracted end 13 and the spring loop 12, a raised cam and gripper portion 14. The cam or gripper portion 14 has an inner surface 15, perpendicular to the member 10 and forming, between the members and the loop 12, a large fabric or garment receiving opening or chamber 16.

The upper surface 17 of the cam 14, as seen in Fig. 1 of the drawing, is curved and contracted or tapered gradually in the direction of the end 13 and terminates at 18 in alinement with the upper surface of the member 10. The member 11 is curved in the direction of the member 10 and the curvature of the inner surface 19 of the member 11, at least in the molding operation, is parallel or substantially parallel to the surface 17.

The free end of the member 11 has a projecting tab or fingerpiece portion 20, which is arranged parallel to the member 10. This fingerpiece portion 20 will facilitate flexing the member 11 away from the member 10 in disengaging the clip from the garment or other body, in connection with which the clip is used.

In order to lighten the clip, the cam 14 is molded hollow or, in other words, has a chamber 21 therein, as clearly noted in Fig. 3 of the drawing. The gripper portion may be said to include wall means extending from the upper curved surface portion thereof to the lower surface of the straight member 10 and disposed within opposed side-edges of said straight member.

As above stated, the member 10 has tapered side walls 22 to form the contracted end 13; whereas, the side walls 23 of the member 11 are parallel or maintain the same width throughout the length of the member, this width being common to the width of the spring loop 12, as will clearly appear from a consideration of Fig. 2 of the drawing.

While both members 10 and 11 are adapted to be sprung apart one with respect to the other, for purposes of description, the member 11 will be regarded as a spring member movable relatively to the cam and gripper portion 14 in securely retaining the clip on a fabric or garment of any type or kind. Clips of the kind under consideration can be supplemented for ordinary pins or other types of fasteners in supporting and/or holding garments or fabrics in predetermined position or in engagement with each other.

Having fully described my invention, what I claim as new and desire to secure by Letters Patent is.

1. A molded plastic clip of the character described, comprising two members integrally joined in a spring loop, one member being longitudinally straight and having intermediate its ends a raised gripper portion, said gripper portion having an upper curved surface portion tapered gradually toward the free end only of said straight member, said gripper portion including wall means extending from the upper curved surface portion of the gripper portion to the lower surface of said straight member and disposed within opposed side edges of said straight member, the companion member being curved throughout the major portion of its length and arranged over and in close proximity to the upper curved surface of the gripper portion of the first member, said gripper portion throughout its length extending the full width of the first member, the upper surface of the gripper portion in combination with the companion member serving to grip predetermined articles arranged between said members, and said gripper portion having an inner surface perpendicular to the first named member and spaced from the spring loop to form a large opening between said members, loop and gripper portion.

2. A clip as defined in claim 1, wherein the first member has tapered sides tapering continuously from the spring loop to the other end of said first member, and the companion member being of the same width throughout its length.

References Cited in the file of this patent

UNITED STATES PATENTS

| 1,129,361 | Perry | Feb. 23, 1915 |
| 1,381,846 | Maker | June 14, 1921 |
| 1,675,806 | Holden | July 3, 1928 |
| 1,986,071 | Ruske | Jan. 1, 1935 |
| 2,478,376 | De Swart | Aug. 9, 1949 |